(12) United States Patent
Moore et al.

(10) Patent No.: US 10,876,667 B2
(45) Date of Patent: Dec. 29, 2020

(54) METHOD OF MAKING AN INLINE HOUSING FOR A PART ENCLOSED IN A TUBE

(71) Applicant: FORD MOTOR COMPANY, Dearborn, MI (US)

(72) Inventors: Chikynda Moore, Belleville, MI (US); Robert Howard Saunders, Jr., Oak Park, MI (US); Robert Joseph Mohan, Canton, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 423 days.

(21) Appl. No.: 15/658,787

(22) Filed: Jul. 25, 2017

(65) Prior Publication Data

US 2018/0045352 A1 Feb. 15, 2018

Related U.S. Application Data

(60) Provisional application No. 62/373,002, filed on Aug. 10, 2016.

(51) Int. Cl.
*B29C 65/70* (2006.01)
*F16L 47/02* (2006.01)
(Continued)

(52) U.S. Cl.
CPC ........ *F16L 47/02* (2013.01); *B29C 45/14467* (2013.01); *B29C 49/4278* (2013.01); *B29C 65/18* (2013.01); *B29C 65/70* (2013.01); *B29C 66/1142* (2013.01); *B29C 66/5344* (2013.01); *B29D 23/003* (2013.01); *F16L 55/0336* (2013.01); *B29K 2101/12* (2013.01); *B29K 2105/253* (2013.01); *B29K 2709/08* (2013.01);
(Continued)

(58) Field of Classification Search
None
See application file for complete search history.

(56) References Cited

U.S. PATENT DOCUMENTS 3,719,209 A * 3/1973 Rush ................. B29C 49/4278
138/177
4,846,359 A * 7/1989 Baird ....................... B29C 49/22
215/12.2

(Continued)

FOREIGN PATENT DOCUMENTS

| JP | 0577321 | 3/1993 |
|---|---|---|
| JP | 2011073250 | 4/2011 |
| JP | 2013238112 | 11/2013 |

*Primary Examiner* — Monica A Huson
(74) *Attorney, Agent, or Firm* — Vincent Mastrogiacomo; Brooks Kushman P.C.

(57) ABSTRACT

A method is disclosed for making a duct assembly including an internal component part such as a silencer is disclosed. The duct assembly may be made in a blow-molding operation in which first and second duct parts are formed from a single parison as a combined part that is then split apart to receive a component part in a housing and subsequently closed by a closure part. Alternatively, the first and second housing parts may be separately formed and a component part may be inserted into a housing defined by one or both of the first and second duct parts. The first and second duct parts may be joined and sealed by injection molding a ring over telescopically assembled ends of the first and second parts.

5 Claims, 4 Drawing Sheets

(51) Int. Cl.
  *B29D 23/00* (2006.01)
  *B29C 45/14* (2006.01)
  *B29C 49/42* (2006.01)
  *B29C 65/18* (2006.01)
  *B29C 65/00* (2006.01)
  *F16L 55/033* (2006.01)
  *F16L 55/00* (2006.01)
  *B29K 101/12* (2006.01)
  *B29K 105/00* (2006.01)
  *B29K 709/08* (2006.01)
  *B29L 23/00* (2006.01)

(52) U.S. Cl.
  CPC ......... *B29L 2023/004* (2013.01); *F16L 55/00* (2013.01)

(56) References Cited

U.S. PATENT DOCUMENTS

| | | | |
|---|---|---|---|
| 5,806,480 A | 9/1998 | Maeda et al. | |
| 6,938,601 B2 * | 9/2005 | Fukumoto | F01N 1/02 123/184.57 |
| 9,278,475 B1 * | 3/2016 | Khami | B29C 49/20 |
| 2007/0157598 A1 | 7/2007 | Atanas et al. | |
| 2008/0264719 A1 | 10/2008 | Seko et al. | |
| 2011/0073406 A1 | 3/2011 | Ortman et al. | |
| 2011/0074067 A1 * | 3/2011 | Khami | F02B 33/44 264/513 |
| 2016/0061362 A1 | 3/2016 | Kret | |

* cited by examiner

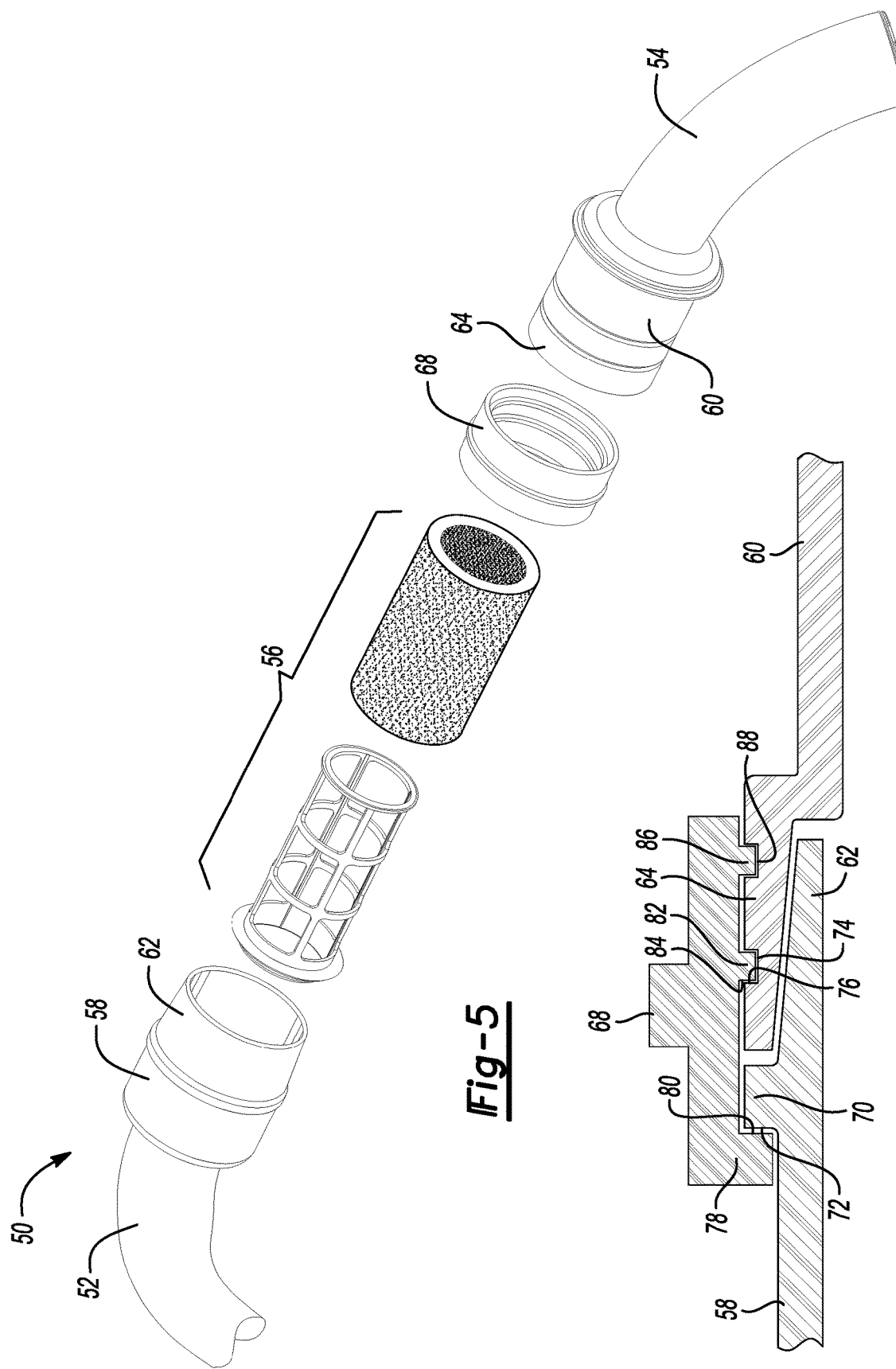

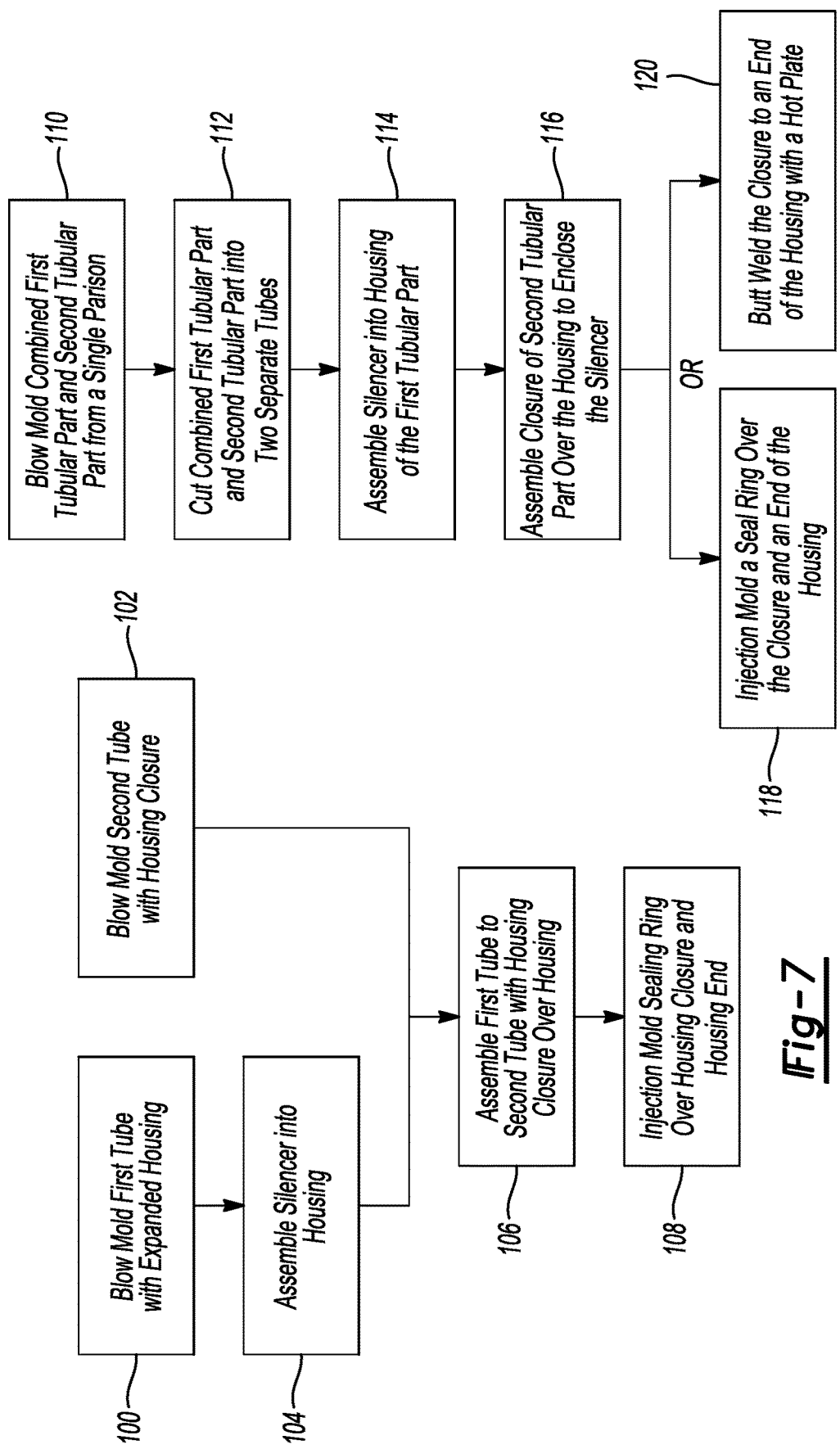

METHOD OF MAKING AN INLINE HOUSING FOR A PART ENCLOSED IN A TUBE

REFERENCE TO RELATED APPLICATIONS

This application claims the benefit of U.S. provisional application Ser. No. 62/373,002 filed Aug. 10, 2016, the disclosure of which is hereby incorporated in its entirety by reference herein.

TECHNICAL FIELD

This disclosure relates to a method of making a tubular component for a vehicle that includes an integrally formed housing for a part assembled inside the tubular component.

BACKGROUND

Vehicles utilize a wide variety of tubular members for inlet air, exhaust, hydraulic fluid, oil and fuel. In some tubes used on vehicles, fluid passing through the tube flows through a component part such as a filter, silencer, sensor, or the like.

Fluid flowing through such components may restrict the flow of the fluid through the tube. In many instances, a separate housing part must be provided to house a component part. The separate housing part may include an inlet connector from one tube and an outlet connector to a downstream tube. One example of such a housing is a clam-shell housing with fittings assembled to the housing for inlet and outlet tube connections. Providing a separate housing results in the need to provide a relatively large number of parts that are assembled in numerous assembly steps. The number of parts and assembly steps required to manufacture the separate housing for a component part may result in quality control problems and increases the cost of a vehicle.

There is a need for a simple, effective and reliable method of providing a tube with an internal component without restricting fluid flow through the tubular member while reducing the number of parts, number of assembly steps, weight, and cost of the tubular assembly.

This disclosure is directed to solving the above problems and other problems as summarized below.

SUMMARY

According to one aspect of this disclosure, a method is disclosed for making a duct assembly including an integrally formed housing and an integrally formed closure member that enclose a component part in the housing in a sealed relationship. In a first step, a single parison is placed in a die to form a first duct part including the housing and a second duct part including the closure member. The closure member is severed from the housing to separate the first and second duct parts. A component part is assembled into the housing and the closure member is assembled to the housing. A sealed connection is formed between the closure member and the housing when they are joined together.

According to other aspects of this disclosure, the step of sealing the connection may further comprise heating a first flange of the closure member and a second flange of the housing on opposite sides of a heated plate and compressing the first flange and the second flange together after the heating step. Alternatively, the step of sealing a connection may further comprise placing the closure member and the housing into an injection molding die with the closure member being telescopically received over the housing and molding a ring over a portion of the housing and a portion of the closure member.

The step of severing the closure member from the housing may be performed with a heated knife.

The housing may have a greater cross-section in the radial direction than the other portions of the duct part.

The component part may be a silencer formed of an energy absorbing material. The energy absorbing material may be fiberglass retained in a cylindrical retainer that defines a plurality of circumferentially and axially spaced openings.

According to another aspect of this disclosure, a method of making a duct may comprise blow-molding a first parison in a first die to form a first duct part including a housing and blow-molding a second parison in a second die to form a second duct part including a closure member. A component part is assembled into the housing and the closure member is assembled to the housing to enclose the component part. A ring-shaped connector forms a seal between the closure member and the housing.

The housing may further include a first radially extending surface and a second radially extending surface. The ring may include a third radially extending surface molded against the first radially extending surface and a fourth radially extending surface molded against the second radially extending surface. The radially extending surfaces cooperate to prevent separation of the housing and the closure member. The ring locks the closure member and the housing together and forms a seal at the connection between the closure member and the housing.

According to another aspect of this disclosure, a duct assembly is provided that includes first and second ducts that define a sealed housing for a component part. The first duct includes a first length of tubing and an integrally formed housing. The second duct includes a second length of tubing and an integrally formed closure member. The component part is disposed in the housing and is connected by a joint between the housing to the closure member to seal the component part inside the housing.

According to other aspects of this disclosure as it relates to the duct assembly, the joint may further comprise a first telescopic portion of the housing and a second telescopic portion of the closure member that is telescopically assembled onto the first telescopic portion. A continuous ring may be molded over the first telescopic portion and the second telescopic portion to join and seal the joint between the housing and the closure member.

At least one of the first and second lengths of tubing may be made of a thermoplastic polymer that is molded to a shape that is curved along its length.

The above aspects of this disclosure and other aspects will be described below with reference to the attached drawings.

BRIEF DESCRIPTION OF THE DRAWINGS

FIG. 5 is an exploded perspective view of an alternative embodiment of a duct assembly.

FIG. 6 is a fragmentary cross-sectional view showing a ring molded over an inner tubular connector of a first duct part and an outer tubular connector of a second duct part.

FIG. 7 is a flowchart illustrating the steps of the process used to manufacture a tubular assembly according to the embodiment of FIGS. 5 and 6.

FIG. 8 is a flowchart illustrating the steps of a manufacturing process used to form either the duct assembly of FIGS. 1-4 or FIGS. 5 and 6.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
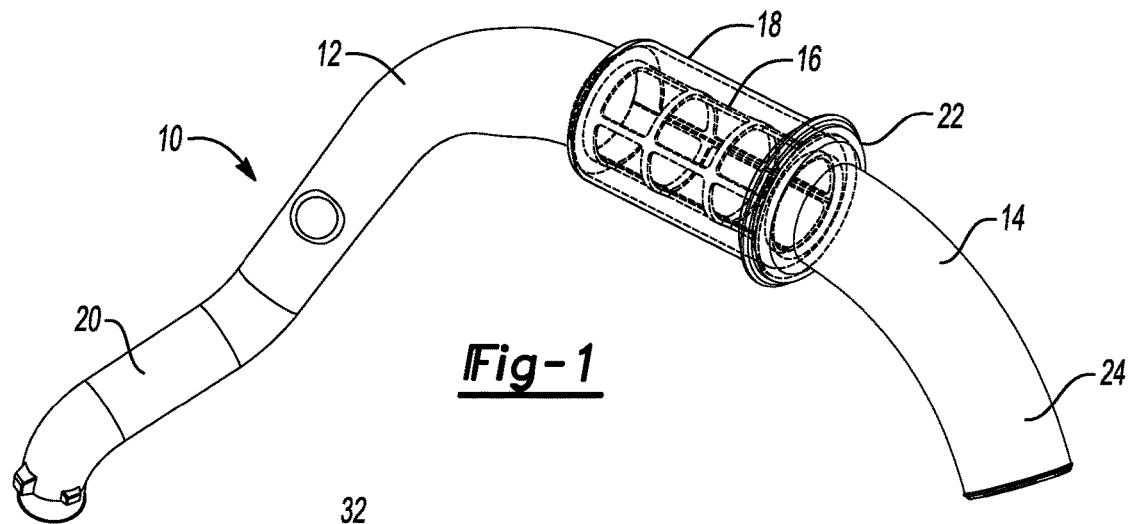
FIG. 1 is a perspective view of one example of a duct assembly made according to one aspect of this disclosure.

Referring to FIG. 1, a duct assembly 10 is illustrated that is formed by the assembly of a first duct part 12 to a second duct part 14. A component part 16, such as a silencer, is assembled within a housing 18. The housing 18 is integrally provided on a first length of tubing 20. A closure member 22 is integrally provided on a second length of tubing 24. The closure member 22 is subsequently joined to the housing 18 as will be more specifically described with reference to FIG. 3 below.

Figure 2:
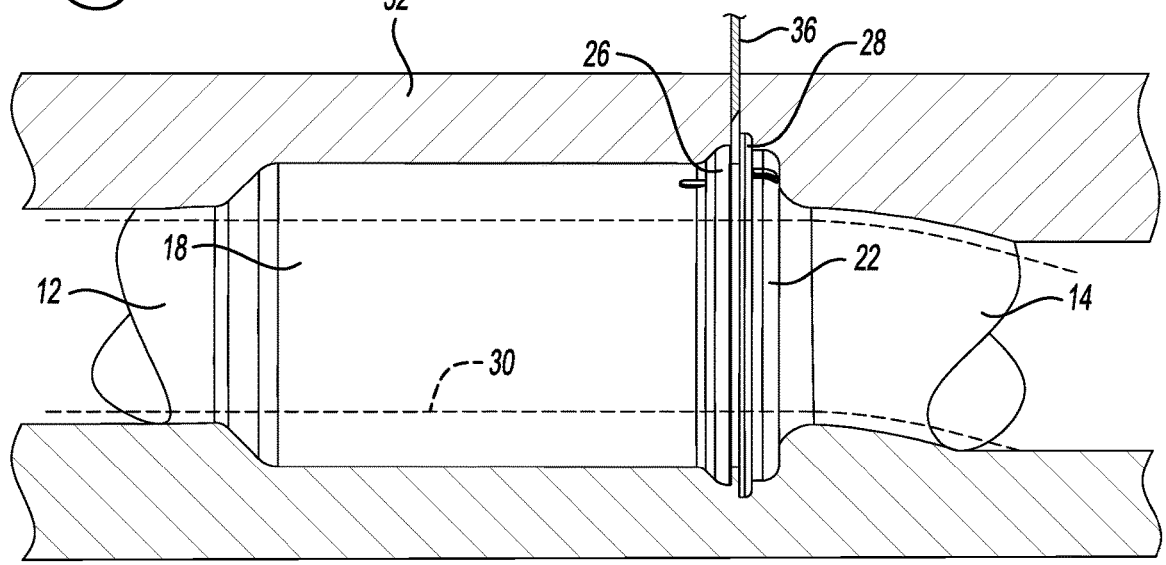
FIG. 2 is a diagrammatic partially cross-section view of a blow-molding die for molding a first and second part of a tubular assembly.

Referring to FIG. 2, a first duct part 12 and a second duct part 14 are shown joined together as they are formed in one piece. A first flange 26 is provided on the housing 18 and a second flange 28 is shown to be provided on the closure member 22. The first duct part 12 and second duct part 14 are formed by a single parison 30 in a single blow-molding die 32. Forming the first and second duct parts 12 and 14 in a single blow-molding 32 with a single parison 30 provides the advantage of eliminating the need to provide two separate blow-molding dies to manufacture a duct assembly 10 that houses a component part 16.

After the first and second duct parts 12 and 14 are formed as a unit, a knife 36, such as a heated knife, may be used to cut the two parts apart in an operation that is performed after the parts are removed from the blow-molding die 32. The knife 36 in FIG. 2 is diagrammatically shown to illustrate the location where the combined part is to be cut in a later operation.

Figure 3:
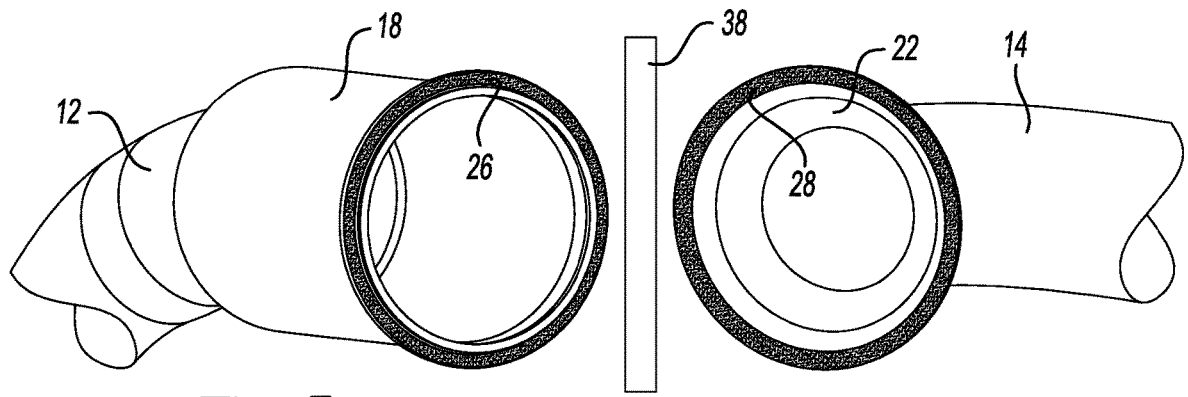
FIG. 3 is a diagrammatic representation of two tubular parts in position to be joined after being heated on a heated plate.

Referring to FIG. 3, the first and second duct parts 12 and 14 are shown separated with the housing 18 being separated from the closure member 22. A first flange 26 is provided on the housing 18 and a second flange 28 is provided on the closure member 22. The first and second duct parts 12 and 14 may be heat-welded together with a butt-weld between the first and second flanges 26 and 28. A heated plate 38 may be used in a subsequent manufacturing step to heat the first flange 26 and second flange 28. After the first and second flanges 26 and 28 are heated by the heated plate 38, the flanges 26 and 28 are pressed together to weld the first duct part 12 to the second duct part 14. Alternatively, the flanges 26 and 28 may be joined by an adhesive, a solvent, a mechanical device, or the like.

Figure 4:
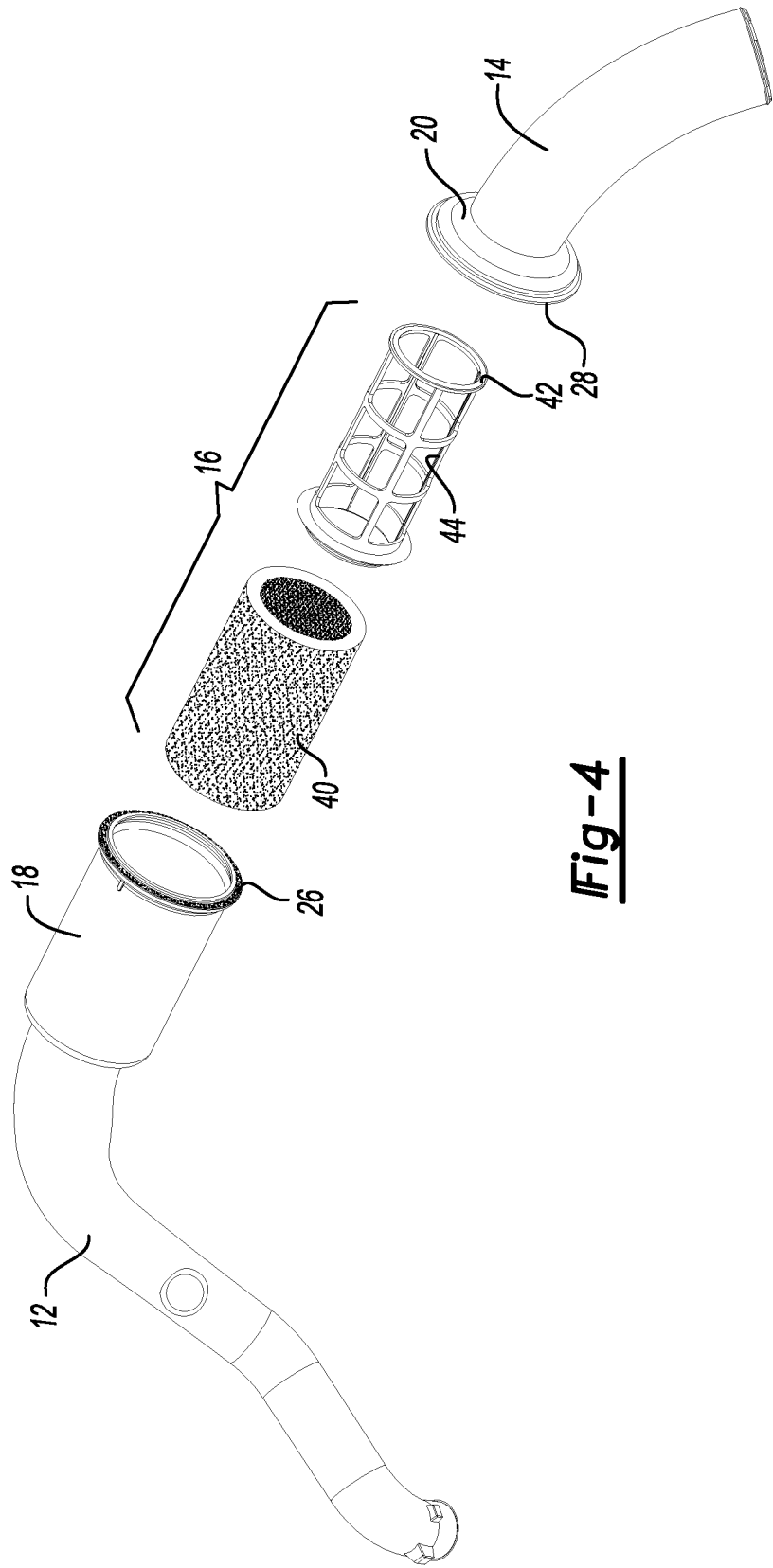
FIG. 4 is an exploded perspective view of the duct assembly shown in FIG. 1.

Referring to FIG. 4, the duct assembly 10 is shown in an exploded perspective view with the first duct part 12 separated from the second duct part 14. The component part 16, in this case a silencer, is shown to include an energy-absorbing sleeve 40 that may be glass fiber formed into a cylindrical tubular shape. The energy-absorbing sleeve 40 is assembled to a retainer 42 that defines a plurality of openings 44. It should be understood that the energy absorbing sleeve 40 may be encapsulated within a mesh sleeve to contain any glass fiber in the silencer 16. The silencer 16 is assembled into the housing 18 before the first and second flanges 26 and 28 are welded together by the heated plate 38 (shown in FIG. 3).

The housing 18 has a larger radial cross-section that the first length of tubing 20 to provide space for the component part 16 without restricting the flow of air through the duct assembly 10. In the illustrated embodiment, the duct assembly 10 is an inlet air duct that supplies air to a turbocharger from the air inlet and air cleaner of the air intake system of a vehicle (not shown). The larger cross-section of the housing 18 reduces any flow restriction for air flowing into the turbo-charger (not shown). In the illustrated embodiment, the housing 18 is substantially larger than the closure member 22, but it should be understood that the housing and closure member could be substantially equal in length provided that they may be securely joined together and sealed to prevent any leakage of air from between the housing 18 and the closure member 22.

Referring to FIGS. 5 and 6, an alternative duct assembly 50 is illustrated in an exploded perspective view. A first duct part 52 and a second duct part 54 combined to provide the duct assembly 50 are shown separated from each other. The first and second duct parts 12 and 14 are preferably formed of polypropylene, nylon or another type of thermoset material. A component part 56, such as a silencer, is also shown to be separated from the enclosure but in position to be inserted into a first housing part 58. A second housing part 60 is adapted to receive part of the component part 56. An inner tubular connector 62, or first telescopic portion, is provided on the first housing part 58. An outer tubular connector 60, or second telescopic portion, is provided on the second housing part 60.

Referring to FIG. 6, the first housing part 58 and second housing part 60 are shown joined together with the inner tubular connector 62 being received within the outer tubular connector 64. A ring 68 is shown between the first duct part 52 and second duct part 54. The ring 68 joins and seals the first housing part 58 to the second housing part 60.

The first housing part 58 includes a rib 70 having a first radially extending surface 72. A groove 74 is provided on the outer tubular connector 64 and includes a second radially extending surface 76. The ring 68 includes a lip 78 on its distal end that has a third radially extending surface 80. The third radially extending surface 80 is molded into engagement with the first radially extending surface 72 of the rib 70. A rib 82 is molded on the ring 68 and includes a fourth radially extending surface 84 that is molded against the second radially extending surface 76 of the rib 82 to join and seal the connection between the inner tubular connector 62 and the outer tubular connector 64.

As shown in FIG. 6, an additional second rib 86 may be provided on the ring 68 and a second groove 80 may be provided on the outer tubular connector 64 to provide an additional joining and sealing area between the inner tubular connector 62 and outer tubular connector 64. The inner and outer tubular connectors 62 and 64 are also referred to herein as first and second telescopic portions.

The ring 68 is injection molded over the inner tubular connector 62 and outer tubular connector 64. The first duct part 52 and second duct part 56 may be formed of a thermo-plastic material such as polypropylene that is filled with talc to reduce the cost and weight of the duct assembly. Alternatively, the first and second duct part 52 and 54 may be formed of other thermoset material such as nylon, or the like. The ring 68 may be formed from thermo-plastic material. The first and second duct parts 12 and 14 are preferably formed of polypropylene, nylon or another type of thermoset material.

Referring to FIGS. 5-7, the process for manufacturing the duct assembly 50 shown in FIGS. 5 and 6 is described with reference to a flowchart. According to the process, a first tube 52 is blow-molded at 100 to include an expanded housing 58. A second tube 54 is blow-molded with a closure member, or second housing part 60 at 102. A silencer 56 is assembled into the housing 58 at 104 and the first tube 52 including the silencer 56 is assembled to the second tube 54 with the housing closure at 106. The first tube 52 is assembled to the second tube 54 with the housing closure 60 being assembled over the housing 58. A sealing ring 68 is injection molded at 108 over the housing 58 and second housing part 60.

Referring to FIG. 8, a method of manufacturing the embodiment of FIGS. 1-4 or FIGS. 5-6 is described with reference to a flowchart. In the first step of the process, a combined first tubular part 16 and second tubular part 18 are blow-molded from a single parison 30 of thermo-plastic material at 110. Next, the first tubular part and second tubular part are cut at 112 into two separate tubes. A silencer 16 is then assembled at 114 into the housing 18 of the first tubular part. The closure member 22 of the second tubular part is assembled over the housing to enclose the silencer at 116. To manufacture a duct assembly according to FIGS. 5 and 6, a seal ring 68 is injection molded over the closure and an end of the housing at 118. Alternatively, to manufacture the duct assembly according to the embodiment shown in FIGS. 1-4, the closure member 22 may be butt-welded at 120 to an end of the housing 18 with a heated plate 38.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of making a duct comprising:
    blow-molding a single parison in a die to form a first duct part including a housing and a first flange and a second duct part including a closure member and a second flange;
    severing the closure member from the housing between the first and second flanges;
    inserting a component part into the housing;
    assembling the closure member to the housing to enclose the component part; and
    joining and sealing the second flange of the closure member to the first flange of the housing.

2. The method of claim 1 wherein the step of joining and sealing further comprises:
    heating the second flange of the closure member and the first flange of the housing on opposite sides of a heated plate; and
    compressing the first flange and the second flange together after the heating step.

3. The method of claim 1 wherein the step of severing the second flange of the closure member from the first flange of the housing is performed with a heated knife.

4. The method of claim 1 wherein the component part is a silencer formed of an energy absorbing material.

5. The method of claim 4 wherein the energy absorbing material is fiberglass retained in a cylindrical retainer defining a plurality of circumferentially and axially spaced openings.

* * * * *